(12) United States Patent
Fujiwara et al.

(10) Patent No.: US 11,349,409 B2
(45) Date of Patent: May 31, 2022

(54) POWER CONVERSION DEVICE AND POWER CONVERSION SYSTEM

(71) Applicant: Mitsubishi Electric Corporation, Tokyo (JP)

(72) Inventors: Kenji Fujiwara, Tokyo (JP); Tatsuya Okuda, Tokyo (JP); Takahiro Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 133 days.

(21) Appl. No.: 16/979,870

(22) PCT Filed: Mar. 18, 2019

(86) PCT No.: PCT/JP2019/011072
§ 371 (c)(1),
(2) Date: Sep. 11, 2020

(87) PCT Pub. No.: WO2019/220763
PCT Pub. Date: Nov. 21, 2019

(65) Prior Publication Data
US 2021/0367531 A1    Nov. 25, 2021

(30) Foreign Application Priority Data

May 15, 2018  (JP) .............................. JP2018-093428

(51) Int. Cl.
*H02M 7/00*  (2006.01)
*H02M 7/493*  (2007.01)
(Continued)

(52) U.S. Cl.
CPC .............. *H02M 7/493* (2013.01); *H02J 3/32* (2013.01); *H02J 7/0025* (2020.01); *H02J 7/0048* (2020.01); *H02J 7/0068* (2013.01)

(58) Field of Classification Search
CPC .......... H02M 7/493; H02J 3/32; H02J 7/0025; H02J 7/0048; H02J 7/0068
See application file for complete search history.

(56) References Cited

U.S. PATENT DOCUMENTS 10,256,747 B2    4/2019  Kato et al.
11,245,333 B2 *  2/2022  Kawamura ............. H02M 1/14
2015/0244278 A1 * 8/2015  Hirano .................... B60L 53/22
                                                                    307/24

FOREIGN PATENT DOCUMENTS

JP       33-242173 A    10/1988
JP    2016-119820 A     6/2016
(Continued)

OTHER PUBLICATIONS

International Search Report and Written Opinion dated May 28, 2019 for PCT/JP2019/011072 filed on Mar. 18, 2019, 6 pages including English Translation of the International Search Report.

*Primary Examiner* — Adolf D Berhane
*Assistant Examiner* — Afework S Demisse
(74) *Attorney, Agent, or Firm* — Xsensus LLP

(57) ABSTRACT

A control circuit corrects a reference gain by multiplying the reference gain by a correction value set in association with state-of-charge information of a storage battery, and uses the corrected reference gain as a first gain for controlling a DC/AC inverter, to adjust the slope of frequency drooping characteristic. The correction value is a value that gradually decreases with increase in state-of-charge information of the storage battery, the minimum value of the correction value is N1 which is a real number greater than 0 and corresponding to a first state of charge for stopping charging of the storage battery, and the maximum value of the correction value is N2 which is a real number greater than N1 and
(Continued)

corresponding to a second state of charge for stopping discharging of the storage battery.

20 Claims, 10 Drawing Sheets

(51) Int. Cl.
  *H02J 7/00* (2006.01)
  *H02J 3/32* (2006.01)

(56) References Cited

FOREIGN PATENT DOCUMENTS

| JP | 2016-123243 A | 7/2016 |
| JP | 2018-121479 A | 8/2018 |

* cited by examiner

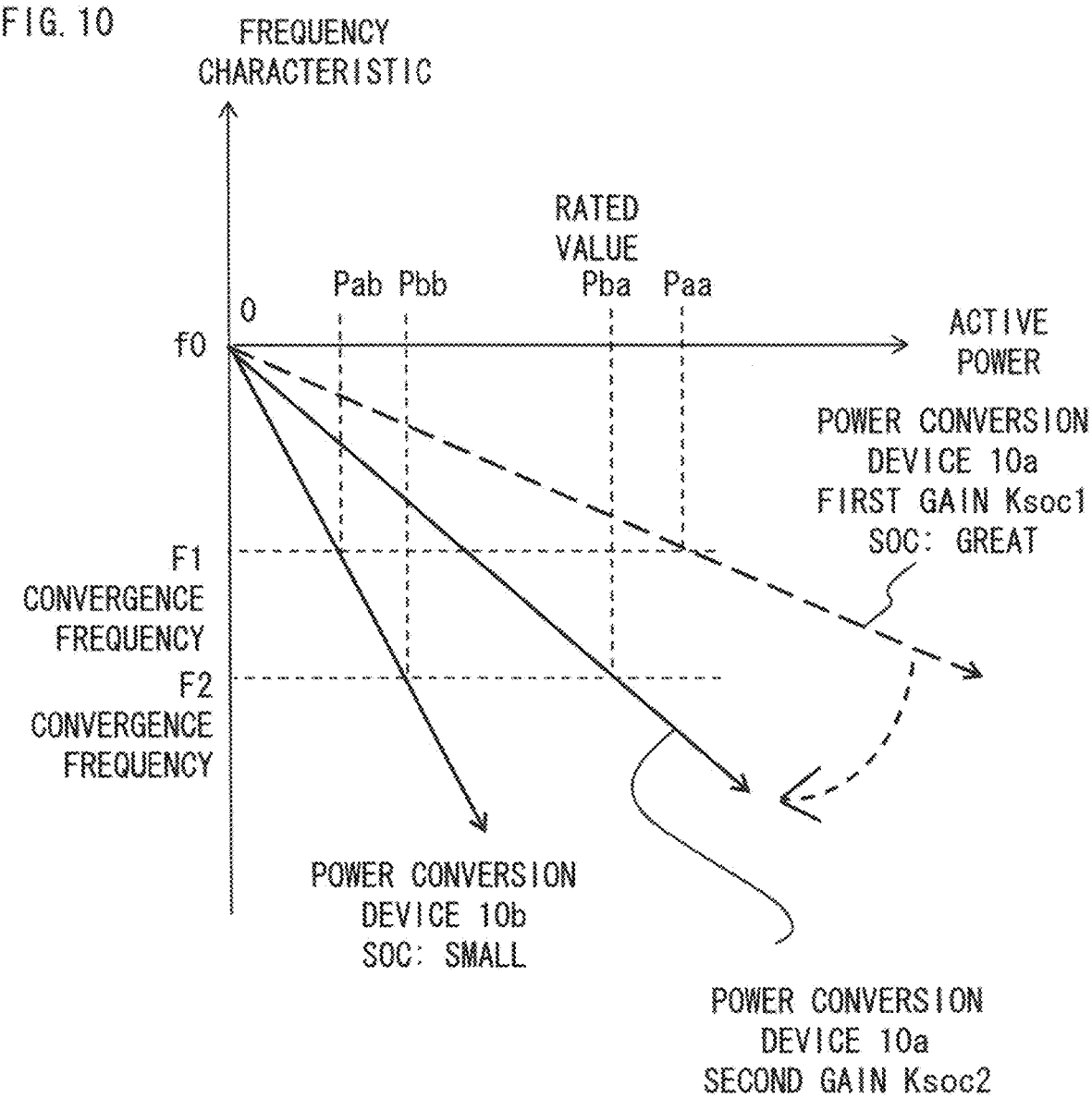

POWER CONVERSION DEVICE AND POWER CONVERSION SYSTEM

CROSS-REFERENCE TO RELATED APPLICATIONS

The present application is based on PCT filing PCT/JP2019/011072, filed Mar. 18, 2019, which claims priority to JP 2018-093428, filed May 15, 2018, the entire contents of each are incorporated herein by reference.

TECHNICAL FIELD

The present disclosure relates to a power conversion device and a power system.

BACKGROUND ART

Conventionally, as measures for the case of power outage on a power grid, there has been increasing demand for power conversion devices such as a distributed power supply and an uninterruptible power supply device that are capable of stand-alone operation as represented by a solar battery system, a storage battery system, and the like. Therefore, it is required to prolong the backup time in which the power conversion device supplies power during power outage on a power grid, and reduce loss during normal operation of the power conversion device. Thus, power conversion efficiency is an important factor. In the case of supplying power to a load from a storage battery mounted on an electric vehicle or the like that can move at the time of disaster or the like, in particular, when large power is required, power of a storage battery of one electric vehicle is not sufficient, and sometimes a plurality of storage batteries are needed. In such a case, AC ends of two or more power conversion devices having storage batteries independent of each other are connected in parallel to supply power to the load. However, in the case where AC ends of two or more power conversion devices of a voltage output type are connected in parallel, if output powers from the power conversion devices are always leveled so that powers are equally outputted, the storage battery that is low in the state of charge (SOC) at the start of usage comes into over-discharge, so that the power conversion device having this storage battery might be stopped. Considering this, the following power conversion devices are disclosed in which output powers of the respective power conversion devices are adjusted in accordance with the SOC of each storage battery.

That is, each of storage battery systems that are power conversion devices is composed of a storage battery and a power conditioner. The power conditioners are collectively connected to a bus. The bus is connected to a power grid and load equipment. In the case where the load equipment is disconnected from the power grid due to power outage on the power grid or the like, the storage batteries are discharged via the power conditioners to supply AC power through the bus to the load equipment.

Each power conditioner is operated in accordance with droop characteristic. A control device weights a frequency correction command to be transmitted to each power conditioner in accordance with the SOC of each storage battery. The control device transmits a frequency correction command weighted to the positive side, to the power conditioner corresponding to the storage battery having high SOC, thereby imparting a positive offset to its droop characteristic. In addition, the control device transmits a frequency correction command weighted to the negative side, to the power conditioner corresponding to the storage battery having low SOC, thereby imparting a negative offset to its droop characteristic (see, for example, Patent Document 1).

In addition, power conversion devices in which output power of each inverter is adjusted in accordance with SOC of each power storage device, are disclosed as follows.

That is, the distributed power supply system is provided with a power supply composed of a plurality of power conversion devices each including a power storage device and an inverter. The inverter has characteristic that, the greater the output amount of AC power (active power) is, the smaller the frequency of the AC power is. The inverter changes the rate of change in the frequency with respect to change in the output amount in accordance with the state of charge. That is, when the state of charge of the power storage device is low, the inverter varies the characteristic so that the reduction rate of the frequency with respect to increase in the output amount becomes large. In addition, when the state of charge of the power storage device is high, the inverter varies the characteristic so that the reduction rate of the frequency with respect to increase in the output amount becomes small (see, for example, Patent Document 2).

CITATION LIST

Patent Document

Patent Document 1: Japanese Laid-Open Patent Publication No. 2016-119820 (paragraphs [0017] to [0036] and FIG. 1 to FIG. 5)

Patent Document 2: Japanese Laid-Open Patent Publication No. 2016-123243 (paragraphs [0101] to [0108] and FIG. 11 to FIG. 12)

SUMMARY OF THE INVENTION

Problems to be Solved by the Invention

In the conventional power conversion devices as described above, each power conversion device adjusts output power in accordance with the state of charge of the storage battery that the power conversion device has. However, in the control as described above, the frequency of output voltage of each power conversion device sometimes varies greatly. Accordingly, malfunction can occur in connected load equipment and operation of the power conversion device can end up stopping.

The present disclosure has been made to solve the above problem, and an object of the present disclosure is to provide a power conversion device capable of suppressing and stabilizing variation in the frequency of output voltage when the power conversion device adjusts output power in accordance with the state of charge of a power storage device, and a power conversion system configured by connecting a plurality of the power conversion devices.

Solution to the Problems

A power conversion device according to the present disclosure includes: a power converter which converts DC power from a DC power supply unit having a power storage device, to AC power, and outputs the AC power to a load; and a control unit for controlling the power converter. The control unit controls the power converter so as to decrease a frequency of output voltage with increase in output power of the power converter, using a set reference gain. In accordance with a detection value of state-of-charge information of the power storage device, the control unit corrects the reference gain by multiplying the reference gain by a correction value set in association with the state-of-charge information of the power storage device, and uses the corrected reference gain as a first gain for controlling the power converter, to adjust a slope of drooping characteristic of the frequency of the power converter. The correction value is a value that gradually decreases with increase in the state-of-charge information of the power storage device, a minimum value of the correction value is N1 which is a real number greater than 0 and corresponding to a first state of charge for stopping charging of the power storage device, and a maximum value of the correction value is N2 which is a real number greater than N1 and corresponding to a second state of charge for stopping discharging of the power storage device.

A power system according to the present disclosure includes a plurality of the power conversion devices configured as described above, wherein AC ends of the power conversion devices are connected in parallel and then connected to the load.

Effect of the Invention

The power conversion device and the power conversion system according to the present disclosure can suppress and stabilize variation in the frequency of output voltage. Thus, the power conversion device is prevented from bearing an excessive power load and stable operation can be performed.

BRIEF DESCRIPTION OF THE DRAWINGS

FIG. 10 is a graph showing allocation of output powers between the power conversion devices according to embodiment 2.

DESCRIPTION OF EMBODIMENTS

Embodiment 1

Figure 1:
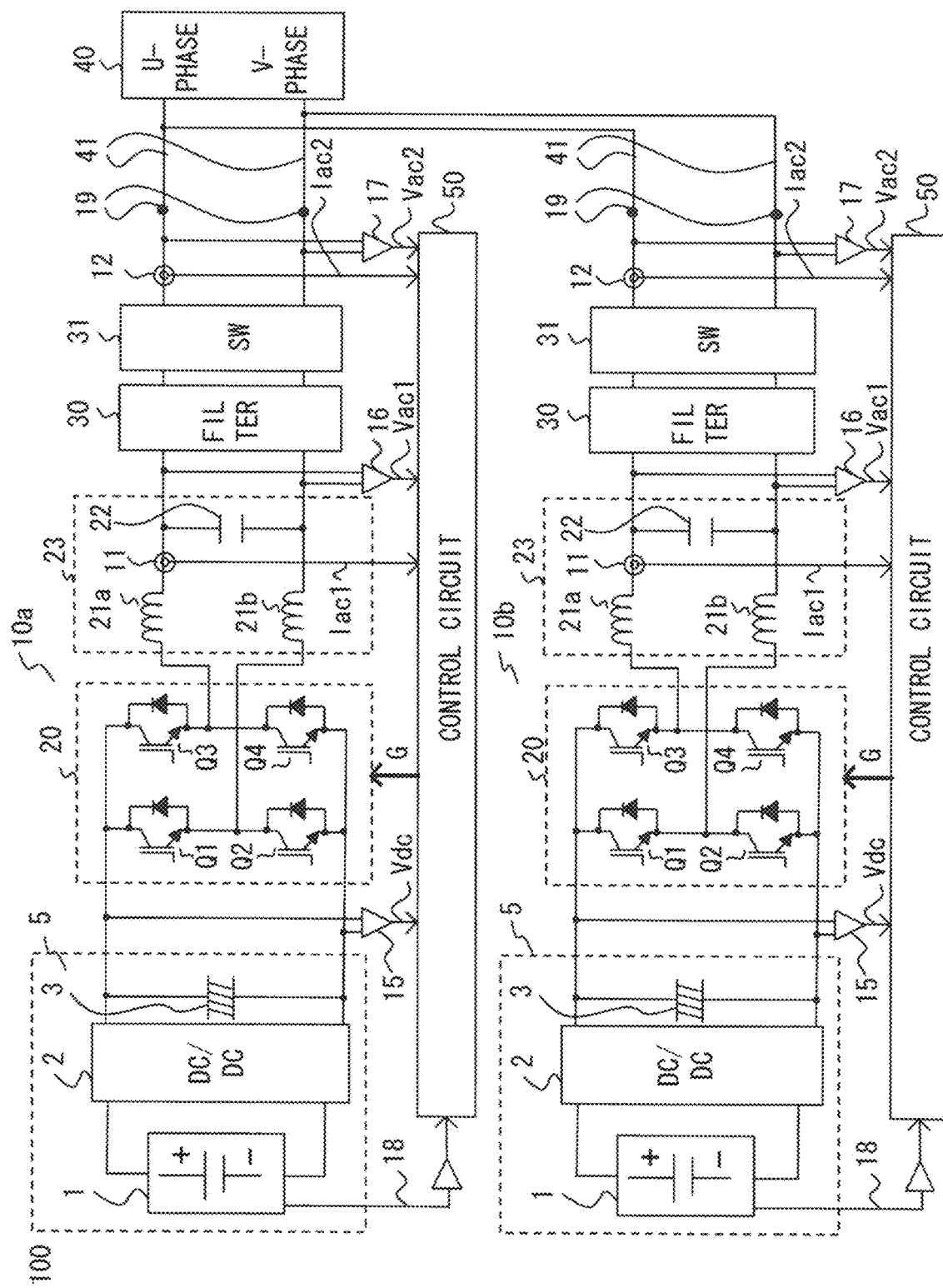
FIG. 1 is a diagram showing a circuit configuration of a power conversion system including a plurality of power conversion devices according to embodiment 1.

FIG. 1 is a diagram showing a circuit configuration of a power system 100 configured by connecting a plurality of power conversion devices 10 (10a, 10b) according to embodiment 1.

Figure 2:
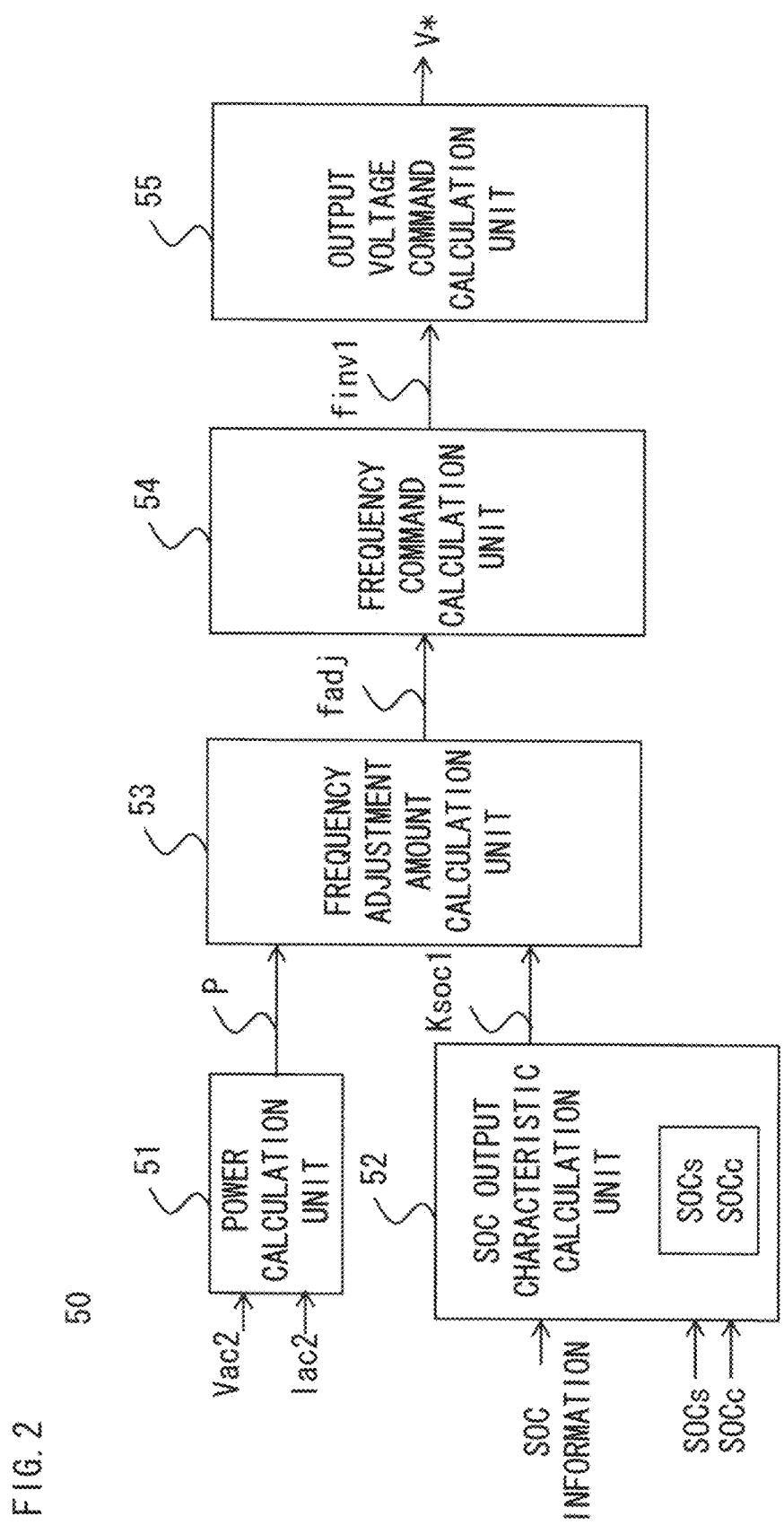
FIG. 2 is a block diagram showing the schematic configuration of a control circuit of the power conversion device according to embodiment 1.

FIG. 2 is a block diagram showing the schematic configuration of a control circuit 50 provided to the power conversion device 10 according to embodiment 1.

Figure 3:
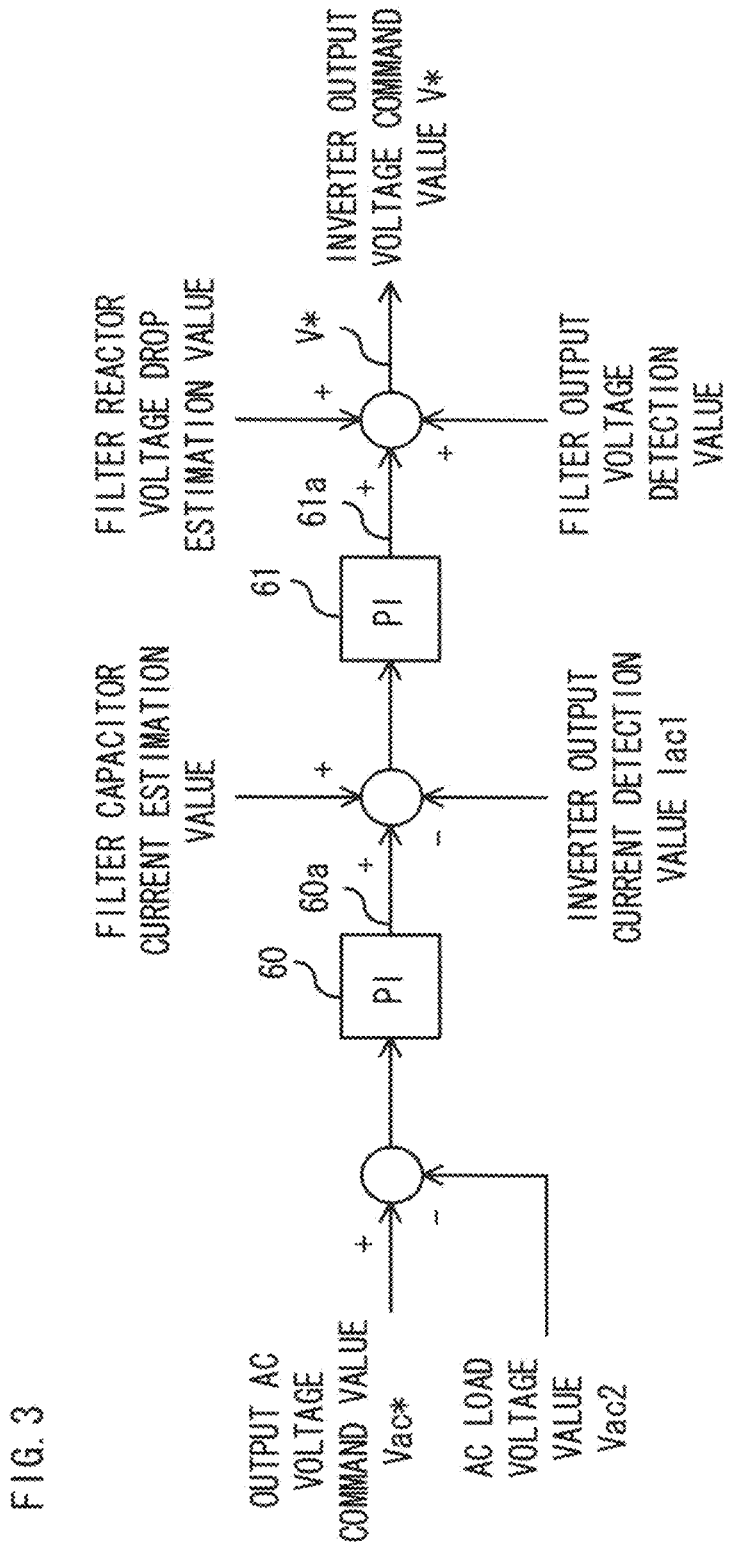
FIG. 3 is a block diagram showing the schematic configuration of an output voltage control circuit of the control circuit according to embodiment 1.

FIG. 3 is a block diagram showing the schematic configuration of an output voltage control circuit of the control circuit 50 according to embodiment 1.

Figure 4:
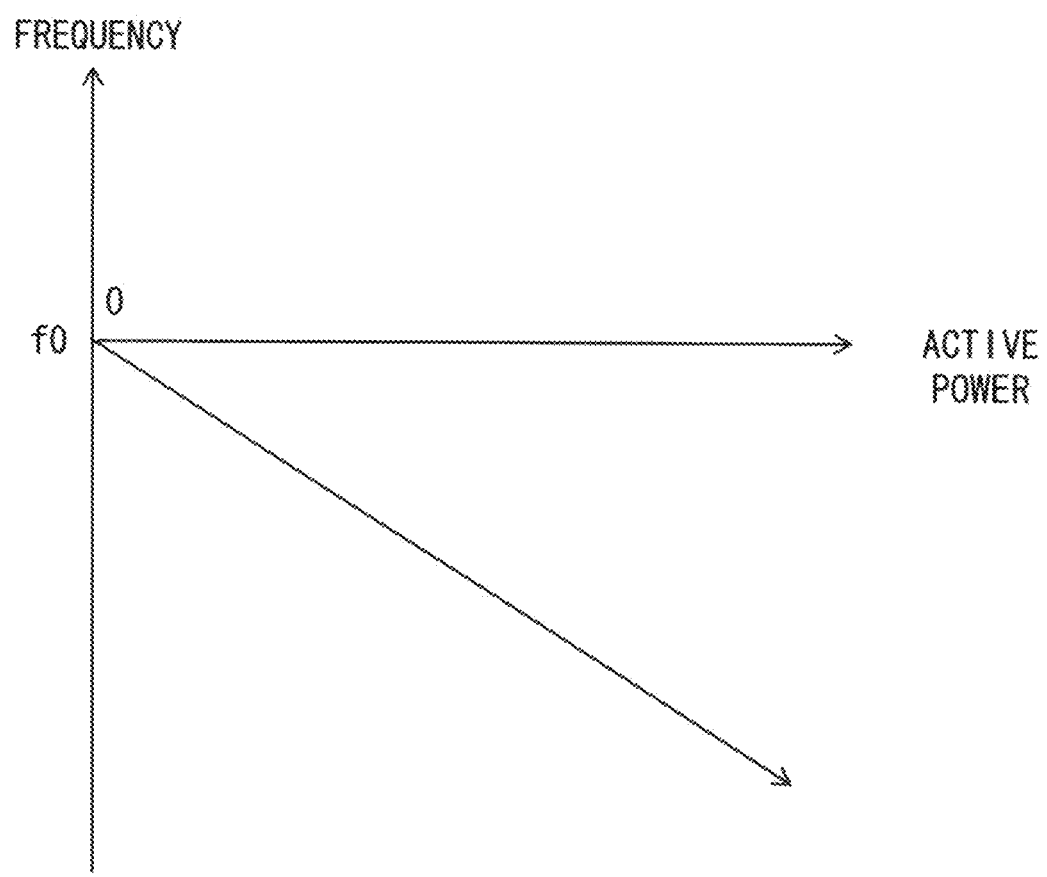
FIG. 4 is a graph showing characteristic of output voltage of the power conversion device according to embodiment 1.

FIG. 4 is a graph showing characteristic of output voltage of a DC/AC inverter 20 in the power conversion device 10 according to embodiment 1.

Figure 5:
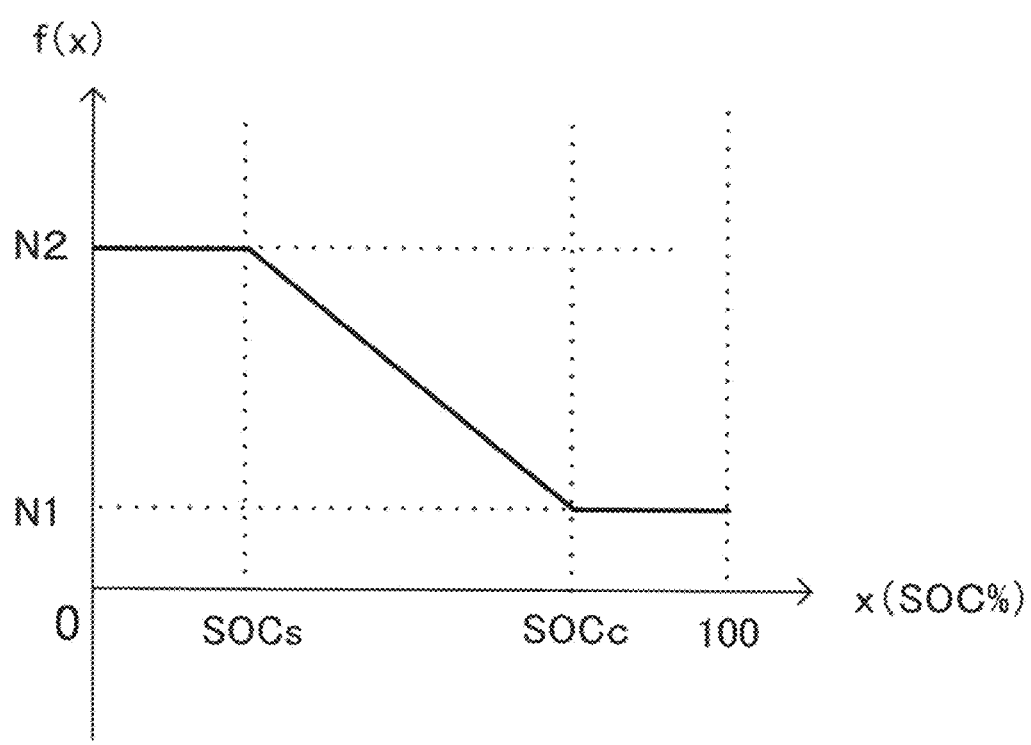
FIG. 5 is a graph on a coordinate plane showing a function used in the control circuit of the power conversion device according to embodiment 1.

FIG. 5 is a graph on a coordinate plane showing a function f(x) for the control circuit 50 to derive a correction value, according to embodiment 1.

As shown in FIG. 1, the power system 100 of the present embodiment 1 includes two power conversion devices 10 (10a, 10b) having the same configuration, and AC terminals 19 of the respective power conversion devices 10 are connected in parallel to buses 41. A load 40 is connected to the buses 41, and through operation of each power conversion device 10, AC power can be supplied from the power conversion devices 10 through the buses 41 to the load 40.

In the present embodiment, the power system 100 is composed of two power conversion devices 10, but the power system 100 may be composed of three or more power conversion devices 10.

Each power conversion device 10 includes a DC power supply unit 5, a DC/AC inverter 20 as a power converter, a smoothing filter 23, a noise filter 30, a switch 31, and a control circuit 50 as a control unit.

The DC power supply unit 5 outputs DC power. The DC/AC inverter 20 converts DC power from the DC power supply unit 5, to AC power, and outputs the AC power. The smoothing filter 23 smooths AC current from the DC/AC inverter 20. The noise filter 30 is provided between the smoothing filter 23 and the load 40, to eliminate noise. The switch 31 is provided between the noise filter 30 and the load 40 and can disconnect the DC/AC inverter 20 from the load 40. The control circuit 50 controls the DC/AC inverter 20.

The circuit configurations of the respective power conversion devices 10 (10a, 10b) are the same and have the same control circuits 50.

The DC power supply unit 5 includes a storage battery 1 as a power storage device, a DC/DC converter 2 which uses the storage battery 1 as an energy source and which directly outputs the output voltage of the storage battery 1 or converts the output voltage to a desired voltage value and outputs the converted voltage, and a capacitor 3 connected between output terminals of the DC/DC converter 2.

The DC/AC inverter 20 is connected between positive and negative terminals of the capacitor 3, and is a full-bridge circuit having four semiconductor switching elements Q1, Q2, Q3, Q4.

The connection point between the semiconductor switching element Q1 and the semiconductor switching element Q2, and the connection point between the semiconductor switching element Q3 and the semiconductor switching element Q4, serve as AC-side output terminals of the DC/AC inverter 20. Thus, through ON/OFF control on the semiconductor switching elements Q1, Q2, Q3, Q4 by gate drive signals G from the control circuit 50, the DC/AC inverter 20 converts DC power from the capacitor 3, to AC power.

As the semiconductor switching elements Q1, Q2, Q3, Q4, self-turn-off semiconductor switching elements such as insulated gate bipolar transistors (IGBT) or metal oxide semiconductor field effective transistors (MOSFET) are used. Free-wheeling diodes are connected in antiparallel to the respective semiconductor switching elements. In the case of using MOSFETs for the semiconductor switching elements, parasitic diodes may be used.

The smoothing filter 23 is connected to output of the DC/AC inverter 20. The smoothing filter 23 is composed of filter reactors 21a, 21b having ends respectively connected to the output terminals of the DC/AC inverter 20, and a filter capacitor 22 connected between other ends of the filter reactors 21a, 21b. AC current smoothed by the smoothing filter 23 passes through the noise filter 30 and the switch 31, to be outputted from the AC terminal 19 of the power conversion device 10 to the buses 41. It is noted that a configuration not having the noise filter 30 and/or the switch 31 may be adopted.

The power conversion device 10 further includes a first current sensor 11 for detecting current Iac1 flowing through the filter reactor 21a at the output from the DC/AC inverter 20, and a second current sensor 12 for detecting AC load current Iac2 smoothed by the smoothing filter 23.

The power conversion device 10 further includes a first DC voltage sensor 15 for detecting voltage Vdc of the capacitor 3 which is DC bus voltage inputted to the DC/AC inverter 20, a first AC voltage sensor 16 for detecting a filter output voltage value Vac1 which is AC voltage applied to the filter capacitor 22 at the output from the smoothing filter 23, and a second AC voltage sensor 17 for detecting AC load voltage Vac2 which is outputted from the power conversion device 10 to the load 40.

The power conversion device 10 further includes an SOC sensor 18 for detecting state-of-charge information (SOC information) such as the charge level in the storage battery 1 which changes along with charging or discharging.

The values detected by the sensors 11, 12, 15 to 18 are inputted to the control circuit 50.

Next, output characteristic of the DC/AC inverter 20 and the configuration and control of the control circuit 50 will be described.

As shown in FIG. 4, the frequency of output voltage of the DC/AC inverter 20 has frequency drooping characteristic that, from a reference frequency f0 at the time when active power is 0 W, the frequency decreases as the active power increases. That is, using a set negative frequency-power characteristic gain, the control circuit 50 performs control such that the frequency of output voltage decreases with increase in the output power of the DC/AC inverter 20. Therefore, the frequency-power characteristic gain is determined by a function having a negative slope.

As shown in FIG. 2, the control circuit 50 includes a power calculation unit 51, a frequency adjustment amount calculation unit 53, an SOC output characteristic calculation unit 52, a frequency command calculation unit 54, and an output voltage command calculation unit 55.

The power calculation unit 51 calculates active power P from the detection value of AC load voltage Vac2 obtained by the second AC voltage sensor 17 and the detection value of AC load current Iac2 obtained by the second current sensor 12. The frequency adjustment amount calculation unit 53 performs proportional control with an input of the calculated active power P to output a frequency adjustment amount fadj. The SOC output characteristic calculation unit 52 determines a frequency-power characteristic gain to be used in the frequency adjustment amount calculation unit 53. The frequency command calculation unit 54 generates a frequency command value finv1 on the basis of the frequency adjustment amount fadj outputted from the frequency adjustment amount calculation unit 53. The output voltage command calculation unit 55 generates an output voltage command value V* for the DC/AC inverter 20 on the basis of the generated frequency command value finv1.

As described above, the SOC output characteristic calculation unit 52 determines the frequency-power characteristic gain to be used in proportional control by the frequency adjustment amount calculation unit 53 at the subsequent stage. In this determination, the SOC output characteristic calculation unit 52 performs correction of multiplying the frequency-power characteristic gain (reference gain K) of the DC/AC inverter 20 by the correction value f(x) determined by the function f on the basis of the following Expression (1), thus determining a new frequency-power characteristic gain (first gain Ksoc1).

$$Ksoc1 = K \times f(x) \qquad \text{Expression (1)}$$

Here, the correction value is the value f(x) uniquely determined by the function f with the variable x being SOC information, e.g., SOC (%), of the storage battery 1 detected by the SOC sensor 18.

Hereinafter, a method for deriving the correction value in the SOC output characteristic calculation unit 52 will be described.

In the SOC output characteristic calculation unit 52, SOCs [%] is set as SOC (second state of charge) for stopping discharging of the storage battery 1. For example, in the case where deterioration of the storage battery 1 progresses when the charge level is smaller than 30%, or in the case where a charge level of 30% needs to be ensured for another purpose, the SOCs for stopping discharging of the storage battery 1 is set to 30%.

In addition, in the SOC output characteristic calculation unit 52, SOCc [%] is set as SOC (first state of charge) for stopping charging of the storage battery 1. For example, in the case where deterioration of the storage battery 1 progresses when the charge level is greater than 90%, the SOCc for stopping charging is set to 90%.

In addition, in the SOC output characteristic calculation unit 52, the function f(x) which is the correction value with SOC used as x is set.

As shown in FIG. 5, the function f(x) set in the SOC output characteristic calculation unit 52 becomes a real number N1 when x which is the SOC of the storage battery 1 detected by the SOC sensor 18 is equal to or greater than the set SOCc [%], and becomes a real number N2 greater than N1 when x which is the detected SOC of the storage battery 1 is equal to or smaller than the set SOCs [%]. In addition, the function f(x) gradually decreases from N2 to N1 as x which is the detected SOC of the storage battery 1 increases from the SOCs to the SOCc.

That is, the function f(x) is represented by the following Expression (2), Expression (3), and Expression (4).

$$f(x) = N2 \qquad \text{Expression (2)}$$

$$0[\%] \leq x \leq SOCs[\%]$$

$$f(x) = a \times x + b \qquad \text{Expression (3)}$$

$$\text{Slope } a = (N1 - N2)/(SOCc - SOCs)$$

$$\text{Intercept } b = N2 - a \times SOCs$$

$$SOCs[\%] < x < SOCc[\%]$$

$$f(x) = N1 \qquad \text{Expression (4)}$$

$$SOCc[\%] \leq x \leq 100[\%]$$

As described above, the control circuit 50 derives the correction value associated with the detected SOC information (in this case, SOC [%]) of the storage battery 1, using the above function f(x).

Thus, the correction value derived by the function f(x) becomes a value that gradually decreases with increase in the SOC information of the storage battery 1. The minimum value of the correction value is N1 which is a real number greater than 0 and corresponding to the first state of charge (charge level: SOCc [%]) for stopping charging of the storage battery 1. The maximum value of the correction value is N2 which is a real number greater than N1 and corresponding to the second state of charge (charge level: SOCs [%]) for stopping discharging of the storage battery 1.

Thus, on the basis of the above Expression (1), in accordance with the detected SOC information of the storage battery 1, the SOC output characteristic calculation unit 52 performs correction of multiplying the frequency-power characteristic gain (reference gain K) by the correction value set in association with the SOC information of the storage battery 1, and outputs the corrected reference gain K as the frequency-power characteristic gain (first gain Ksoc1) for controlling the DC/AC inverter 20, to the frequency adjustment amount calculation unit 53 at the subsequent stage. It is noted that the unit of the first gain Ksoc1 (frequency-power characteristic gain) is frequency/active power.

The frequency adjustment amount calculation unit 53 determines the frequency adjustment amount fadj for the output AC voltage in the proportional control with an input of the active power P calculated by the power calculation unit 51, using the determined first gain Ksoc1, on the basis of the following Expression (5).

$$\text{Frequency adjustment amount fadj} = Ksoc1 \times P \quad \text{Expression (5)}$$

The determined frequency adjustment amount fadj is outputted to the frequency command calculation unit 54 at the subsequent stage.

The frequency command calculation unit 54 calculates a value obtained by adding the frequency adjustment amount fadj to the reference frequency f0, as the frequency command value finv1 for AC voltage outputted from the DC/AC inverter 20, on the basis of the following Expression (6).

$$finv1 = f0 + fadj = f0 + Ksoc1 \times P \quad \text{Expression (6)}$$

The output voltage command calculation unit 55 calculates an output AC voltage command value Vac* for the DC/AC inverter 20, which is formed from a specified amplitude value of AC voltage and a sinewave determined by the frequency command value finv1. Then, the output voltage command calculation unit 55 performs calculation shown in FIG. 3, using the calculated output AC voltage command value Vac* and the value of AC load voltage Vac2 detected by the second AC voltage sensor 17, to perform output voltage control for the DC/AC inverter 20.

As shown in FIG. 3, receiving an input of a deviation between the detected value of the AC load voltage Vac2 and the calculated output AC voltage command value Vac*, a first controller 60 performs, for example, PI control (proportional control), to output an inverter output current command value 60a as a control quantity for reducing the inputted deviation.

As the control quantity to be outputted from the first controller 60, an output voltage correction value may be directly outputted or an inverter output current command value may be outputted. In FIG. 3, a configuration of outputting the inverter output current command value 60a as the control quantity is adopted.

Here, current flowing through the filter capacitor 22 is calculated from the capacitance value of the filter capacitor 22 and the inverter output voltage command value, and the calculated value is added as a filter capacitor current estimation value to the inverter output current command value 60a.

Then, receiving an input of a deviation between an inverter output current detection value Iac1 flowing through the filter reactor 21a and the inverter output current command value 60a, a second controller 61 performs, for example, PI control, to output an output voltage correction value 61a. By the second controller 61, current minor control for outputting the output voltage correction value 61a is formed.

A filter output voltage detection value obtained from the first AC voltage sensor 16 may be added to the output voltage correction value 61a. Also, a voltage drop occurring in the filter reactor 21 may be calculated from the inverter output current command value Iac1, the inductance value of the filter reactor 21, and the frequency command value finv1, and may be added as a filter reactor voltage drop estimation value to the output voltage correction value 61a, to obtain an inverter output voltage command value V*.

Although not shown, the output voltage command value may be added to the output voltage correction value 61a.

Through the inverter output voltage control as described above, the inverter output voltage command value V* for the DC/AC inverter 20 is determined. Then, the control circuit 50 generates and outputs gate drive signals G for the semiconductor switching elements Q1, Q2, Q3, Q4 so that the determined inverter output voltage command value V* is achieved, through drive control for the DC/AC inverter, such as PWM control.

Figure 6:
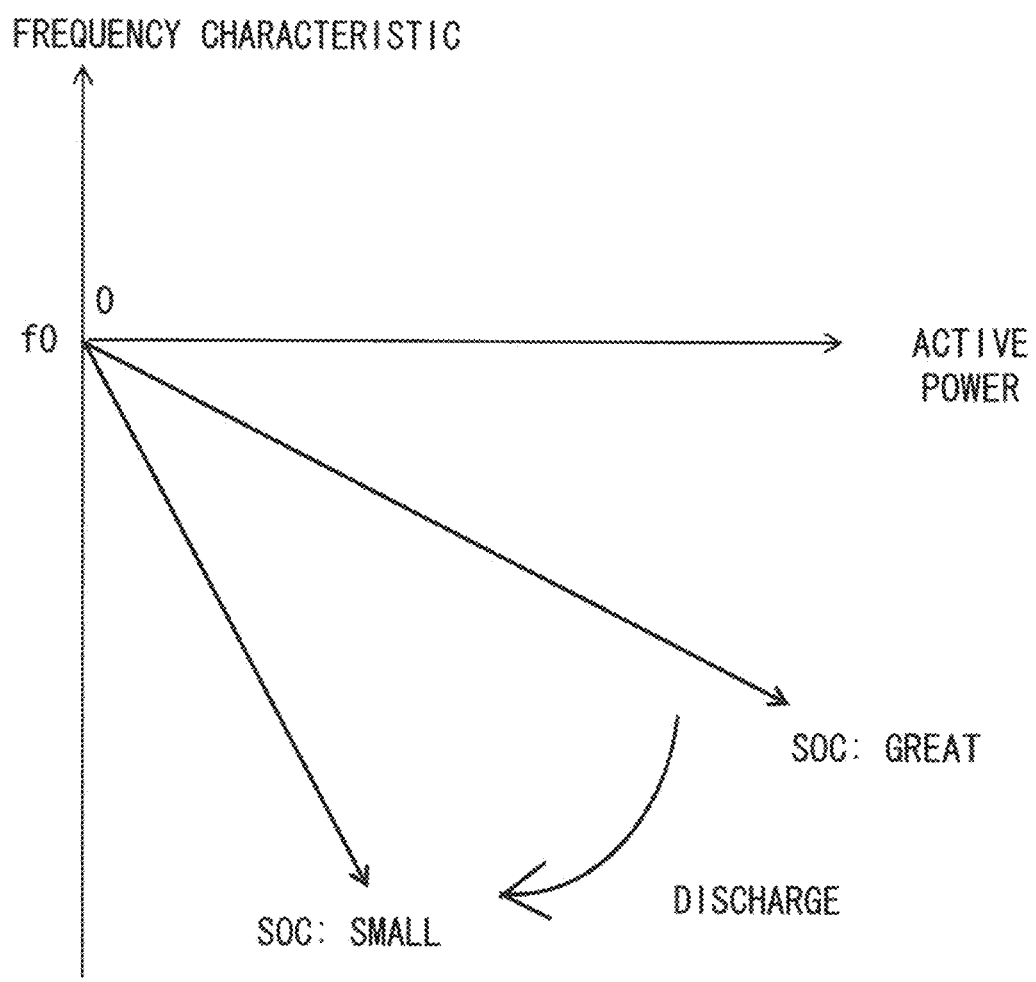
FIG. 6 is a graph showing change in frequency-power characteristic of the power conversion device according to embodiment 1.

FIG. 6 is a graph showing a state in which the control circuit 50 changes the frequency-power characteristic along with reduction in the SOC of the storage battery 1 in the power conversion device 10 according to embodiment 1.

As described above, the power conversion device 10 multiplies the negative frequency-power characteristic gain by the correction value that gradually increases with decrease in the SOC of the own storage battery 1 through discharging, thereby correcting the own frequency-power characteristic gain. Thus, as shown in FIG. 6, the slope of the drooping characteristic of the frequency of the output voltage is adjusted.

Figure 7:
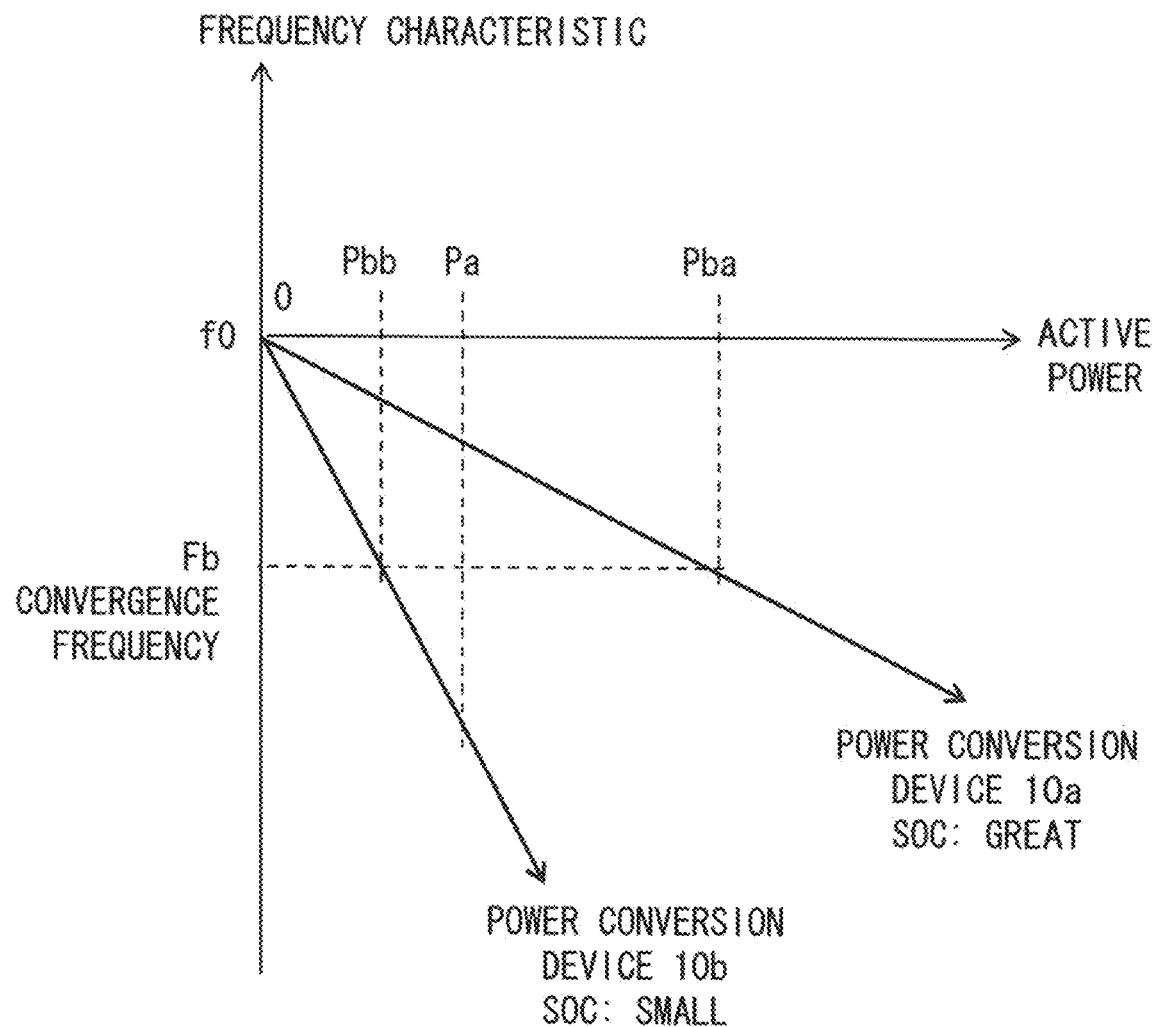
FIG. 7 is a graph showing allocation of output powers between the power conversion devices according to embodiment 1.

FIG. 7 is a graph showing that, in the power conversion devices 10a, 10b according to embodiment 1, power allocation between the power conversion devices 10a, 10b differs depending on the difference in the SOC of the storage batteries 1.

Under the assumption that, of the two power conversion devices 10a, 10b included in the power system 100, the SOC of the storage battery 1 provided to one power conversion device 10a is great and the SOC of the storage battery 1 provided to the other power conversion device 10b is small, fb is the frequency when the control has converged, and Pba and Pbb are operation points of active power when the control has converged. When the frequency-power characteristic gains of the power conversion devices 10a, 10b are corrected by their respective control circuits 50, the power conversion devices 10a, 10b which have been each outputting the active power Pa are subjected to their own frequency-power characteristic gains, to reach convergence of control at the frequency fb at which the sum of output powers of the power conversion devices 10a, 10b becomes the same. At the convergence frequency fb, active power outputted from the power conversion device 10a is Pba, and active power outputted from the power conversion device 10b is Pbb. Thus, it is found that power allocation is made in accordance with the magnitude relationship of SOC.

As described above, each power conversion device 10 (10a, 10b) independently corrects the own frequency-power characteristic by the individual control circuit 50, and is subjected to the corrected frequency-power characteristic, whereby the own power allocation is adjusted without communication with the other power conversion device 10 (10a, 10b).

Here, regarding the correction value for correcting the frequency-power characteristic of the DC/AC inverter 20, the minimum value is N1 corresponding to the SOCc for stopping charging of the storage battery 1, and the maximum value is N2 corresponding to the SOCs for stopping discharging of the storage battery 1, as shown in FIG. 5. Therefore, even if the charge level of the storage battery 1 greatly varies from the charge level for stopping discharging to the charge level for stopping charging, the correction value varies within a range from N2 to N1. Thus, the variation range of the frequency-power characteristic of the power conversion device 10 determined using the above correction value, i.e., the variation range of the slope of the drooping characteristic of the frequency, can be kept within a certain range. Thus, the frequency of output voltage can be prevented from greatly varying when control of the power conversion device 10 converges, and the output frequency can be stably converged.

In addition, in order that the variation range of the frequency when control of the power conversion device 10 converges falls within a desired variation range such as a range not exceeding 2% from the reference frequency f0, the upper limit value N2 and the lower limit value N1 of the correction value may be determined in accordance with the value of the frequency characteristic gain (reference gain K) before correction. By keeping the variation range of the output voltage at the time of control convergence within a desired reference range as described above, it is possible to perform operation in accordance with the specifications of connected load equipment or the like.

Hereinafter, another configuration example of the correction value for correcting the frequency-power characteristic of the DC/AC inverter 20 will be described.

Figure 8:
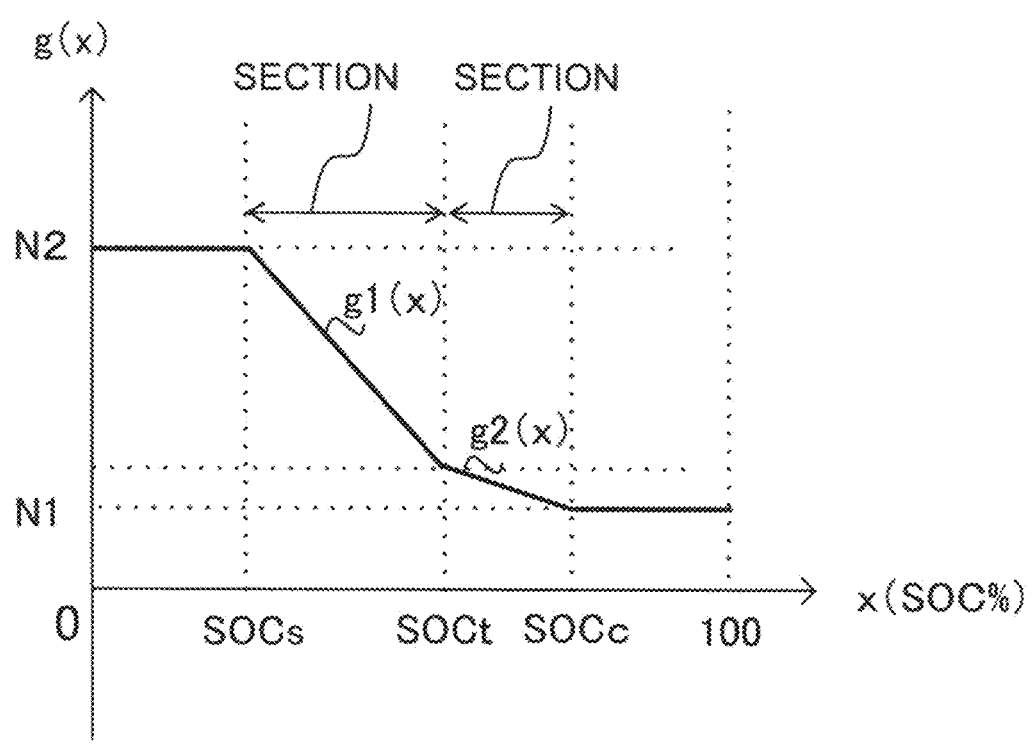
FIG. 8 is a graph on a coordinate plane showing a function used in the control circuit of the power conversion device according to embodiment 1.

FIG. 8 is a graph on a coordinate plane showing another function g(x) for the control circuit 50 to derive the correction value, according to embodiment 1. Also in this case, x is the same as in the case of function f(x), and the value of g(x) is the correction value.

As shown in FIG. 8, the control circuit 50 divides the range between SOCs [%] and SOCc [%] into two sections. Then, the control circuit 50 uses, in the range between SOCs [%] and SOCc [%], a function g1(x) for the section between SOCs [%] and SOCt and a function g2(x) for the section between SOCt and SOCc [%], and in the two functions g1(x), g2 (x), the slopes at which the correction value gradually decreases with increase in SOC are different in their respective sections.

As described above, the correction value is set so as to have, between SOCs [%] and SOCc [%], at least two sections in which the correction value gradually decreases at respective different slopes with increase in SOC, whereby it is possible to adjust output power of the power conversion device 10 in accordance with the characteristic of the storage battery 1. In particular, if the correction value is set such that the absolute value of the slope of the correction value in the section on the SOCc [%] side is smaller than the absolute value of the slope of the correction value in the section on the SOCs [%] side, the power conversion device 10 can be kept in a state capable of high output during a period from SOCct to SOCc [%] in which the storage battery 1 has high SOC, and thus convenience is improved.

It is noted that the SOCc and the SOCs set in the SOC output characteristic calculation unit 52 of the control circuit 50 are not limited to values set in advance, and may be set by a user from outside.

Here, regarding deterioration during long-term preservation of the storage battery 1, it is general that deterioration in a full-charge state is great. However, regarding long-term preservation, some types of storage batteries have an SOC range in which deterioration is more accelerated than in a full-charge state. Accordingly, in the control circuit 50, a discharge prohibited range specifying the range of state-of-charge information in which discharging of the storage battery 1 is prohibited, is set. Specifically, a range of ±X % from the median in the SOC range in which deterioration of the storage battery 1 is accelerated is set as the discharge prohibited range. Then, if the inputted SOCs is within the discharge prohibited range, in order that stop of discharging will not occur in the discharge prohibited range, the inputted SOCs is corrected by adding or subtracting an offset voltage to or from the inputted SOCs so that the inputted SOCs becomes a value outside the discharge prohibited range, and the corrected SOCs is set as a new SOCs for stopping discharging. This setting suppresses deterioration during long-term preservation of the storage battery 1, whereby the life of the storage battery 1 can be prolonged.

In the above description, the correction value for correcting the frequency-power characteristic of the DC/AC inverter 20 is derived on the basis of the function f(x) or g(x) by the control circuit 50. However, without limitation thereto, for the correction value, a data map or the like set and recorded in advance in the control circuit 50 may be used. The data map may be configured such that the correction value can be selected from correction values set in association with the SOC information of the storage battery 1.

In the power conversion device and the power system according to the present embodiment configured as described above, the power conversion device corrects the reference gain by multiplying the reference gain by the correction value set in association with the SOC information of the storage battery in accordance with the detection value of the storage battery, and uses the corrected reference gain as the first gain for controlling the power converter, to adjust the slope of the drooping characteristic of the frequency of the power converter. Thus, it is possible to adjust the output power in accordance with the SOC of each of the storage batteries of the power conversion devices individually. Therefore, in the case where the SOC of the own storage battery of the power conversion device is low, more power allocation is imposed to another power conversion device having a storage battery at high SOC so that excessive discharging of the own storage battery is suppressed, whereby energy that will be needed after supply to the load is finished can be kept.

Regarding the correction value, the minimum value thereof is the real number N1 greater than 0 and corresponding to the first state of charge for stopping charging of the storage battery, and the maximum value thereof is the real number N2 greater than N1 and corresponding to the second state of charge for stopping discharging of the storage battery. Thus, the variation range of the slope of the drooping characteristic of the frequency of the power converter is kept within a certain range, whereby, even if the charge level of the storage battery varies from the charge level for stopping discharging to the charge level for stopping charging, the frequency of the output voltage can be prevented from greatly varying when control of the power conversion device converges. In addition, the frequency of output voltage of the power converter can be stabilized.

Thus, while over-discharge of the storage battery is suppressed, malfunction of the connected load equipment is prevented, and operation of the power conversion device can be stabilized.

In addition, it becomes possible to perform constant-voltage operation in which the output amount is autonomously adjusted by the power conversion device alone so as to maintain the SOCs set for another purpose (in the case where the storage battery is an on-vehicle battery, driving of the vehicle or the like). Therefore, in such a case of using storage batteries mounted on movable bodies such as an electric vehicle, a hybrid vehicle, etc. of different owners, communication means such as communication lines between the power conversion devices are not needed, thus providing effects such as cost reduction and convenience improvement. In addition, since such communication means between power devices are not needed, it is not necessary to fix the positions where the storage batteries are placed, and a CPU and the like for comprehensively managing the plurality of storage batteries are also not needed.

The correction value may be set so that the variation range of the frequency of the output voltage of the power converter is kept within a predetermined reference range such as a range not exceeding 2% from the fundamental frequency. Thus, it is possible to perform operation in accordance with the specifications of the connected load equipment.

The correction value may be set so as to have at least two sections in which the correction value gradually decreases at different slopes with increase in the SOC, between the SOCs for stopping discharging of the storage battery and the SOCc for stopping charging of the storage battery. Thus, it is possible to adjust the output power of the power conversion device in accordance with the characteristic of the storage battery.

The correction value may be set such that, in the respective sections between the SOCs and the SOCc, the absolute value of the slope of the correction value in the section on the SOCc side is smaller than the absolute value of the slope of the correction value in the section on the SOCs side. Thus, the power conversion device can be kept in a state capable of high output during the period in which the storage battery has high SOC, whereby convenience is improved.

For the correction value, data set in advance in the control circuit may be used, or the control circuit may derive the correction value using the function f(x) or g(x). The configuration in which the control circuit derives the correction value using the function f(x) or g(x) enables reduction in the storage area of the control circuit, whereby space saving and cost reduction can be achieved. On the other hand, the configuration in which correction values are set and recorded in advance in a data map form in the control circuit enables reduction in the calculation load on the control circuit during operation of the power conversion device.

In the control circuit, a discharge prohibited range value for specifying the range of state-of-charge information in which discharging of the storage battery is prohibited may be set. In this case, when the SOCs is set by a user from outside, if the set value is in the discharge prohibited range, the control circuit performs correction so that the set SOCs becomes a value outside the discharge prohibited range. Thus, deterioration during long-term preservation of the storage battery is suppressed, whereby the life of the storage battery can be prolonged.

In the above description, the configuration in which the power conversion device 10 includes the DC power supply unit 5 has been shown. However, without including the DC power supply unit 5 in the power conversion device 10, the DC power supply unit 5 may be provided outside.

Embodiment 2

Hereinafter, with reference to the drawings, embodiment 2 of the present disclosure will be described focusing on a difference from the above embodiment 1. The same parts as those in the above embodiment 1 are denoted by the same reference characters and the description thereof is omitted.

Figure 9:
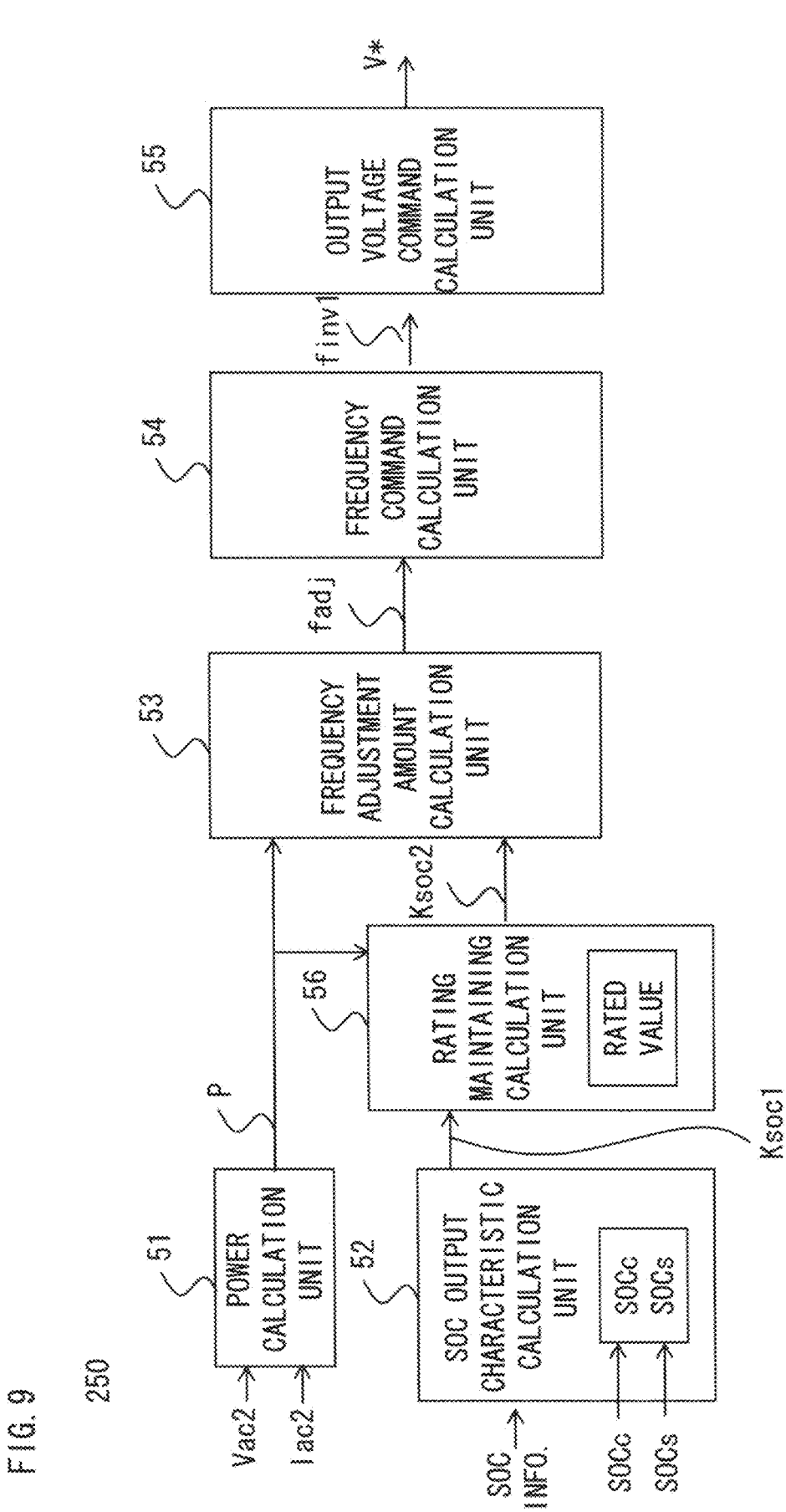
FIG. 9 is a block diagram showing the schematic configuration of a control circuit of a power conversion device according to embodiment 2.

FIG. 9 is a block diagram showing the schematic configuration of a control circuit 250 provided to each power conversion device 10 (10a, 10b) according to embodiment 2.

In the present embodiment, the control circuit 250 includes a rating maintaining calculation unit 56 which receives inputs of the first gain Ksoc1 outputted from the SOC output characteristic calculation unit and the active power P from the power calculation unit 51.

As in embodiment 1, the power system 100 includes two power conversion devices 10 (10a, 10b). The circuit configurations of the power conversion device 10a and the power conversion device 10b are the same, and have the same control circuits 250.

Here, a rated value of the output power of the DC/AC inverter 20 is set in the rating maintaining calculation unit 56 of the control circuit 250. The rated value can be set using active power, apparent power, an output current effective value, or an output current peak value, and in the present embodiment, the rated value is set using active power.

Here, in the case where the SOC of the storage battery 1 of the power conversion device 10a is high and the SOC of the storage battery 1 of the power conversion device 10b is low, the frequency-power characteristic gain (first gain Ksoc1) of the power conversion device 10a, which is a negative value, becomes greater than the frequency-power characteristic gain (first gain Ksoc1) of the power conversion device 10b. As described above, since the AC output frequencies of the power conversion device 10a and the power conversion device 10b converge to the same value, power allocation is different therebetween depending on difference in the frequency-power characteristic determined by each frequency-power characteristic gain.

Here, while the output power allocation to the power conversion device 10a corresponding to high SOC increases, in some cases, the output power of the power conversion device 10a exceeds the rated value set in the rating maintaining calculation unit 56, depending on the magnitude of the load 40.

The rating maintaining calculation unit 56 of each control circuit 250 in the power conversion devices 10a, 10b includes a controller (not shown) exemplified by PI control with an input of a deviation between the set rated value and the active power P outputted from the power calculation unit 51 of the power conversion device 10a, 10b. Then, the rating maintaining calculation unit 56 of the control circuit 250 of the power conversion device 10a generates, by the controller, a control quantity KR for reducing the frequency-power characteristic gain (first gain Ksoc1) outputted from the SOC output characteristic calculation unit 52 of the power conversion device 10a, i.e., increasing the absolute value of the slope of the drooping characteristic of the frequency of the output voltage of the power conversion device 10*a*.

In the present embodiment, the value of the control quantity KR is a real number greater than 0, and KR is gradually increased from 0 as an excess amount by which the active power P exceeds the rated value increases. The rating maintaining calculation unit 56 of the control circuit 250 of the power conversion device 10*a* performs correction of multiplying the frequency-power characteristic gain (first gain Ksoc1) of the DC/AC inverter by a rated control quantity (1+KR) using the control quantity KR on the basis of the following Expression (7), thereby determining and outputting a new frequency-power characteristic gain (second gain Ksoc2).

$$Ksoc2=Ksoc1\times(1+KR) \qquad \text{Expression (7)}$$

The frequency-power characteristic gain (second gain Ksoc2) of the power conversion device 10*a* is set as described above, whereby the frequency-power characteristic gain which is a negative value is reduced, that is, the absolute value of the slope of the drooping characteristic of the frequency of the output voltage is increased. Thus, the power conversion device 10*a* can reduce the own output allocation ratio. As a matter of course, an upper limit value may be set for the control quantity KR.

FIG. 10 shows a result when the rating maintaining calculation unit 56 of the control circuit 250 of the power conversion device 10*a* corrects the frequency-power characteristic gain (first gain Ksoc1), and the convergence frequency and the power operation point are changed in accordance with the reduced frequency-power characteristic gain (second gain Ksoc2).

With the frequency-power characteristic gain (first gain Ksoc1) originally used by the control circuit 250 of the power conversion device 10*a*, as shown in FIG. 10, the control converges at frequency f1, and in this case, active power Paa outputted from the power conversion device 10*a* exceeds a rated value Pba.

Therefore, the rating maintaining calculation unit 56 of the control circuit 250 of the power conversion device 10*a* corrects the frequency-power characteristic gain (first gain Ksoc1) to the frequency-power characteristic gain (second gain Ksoc2), using the rated control quantity (1+KR). This increases the absolute value of the slope of the drooping characteristic of the frequency of the DC/AC inverter 20 during the power period (period from active power 0 to active power Pba) until the output power of the power conversion device 10*a* reaches the rated value Pba. Thus, the convergence frequency reduces to f2, the active power outputted from the power conversion device 10*a* is controlled from Paa to the rated value Pba, and the active power outputted from the power conversion device 10*b* is controlled to follow from Pab to Pbb so as to autonomously additionally output power corresponding to the excess load power of the power conversion device 10*a*. In this way, the output power allocation ratio between the power conversion device 10*a* and the power conversion device 10*b* is changed.

On the other hand, in the case where the SOC of the storage battery 1 of the power conversion device 10*a* is low and the SOC of the storage battery 1 of the power conversion device 10*b* is high, the frequency-power characteristic gain (first gain Ksoc1) of the power conversion device 10*b* which is a negative value becomes greater than the frequency-power characteristic gain (first gain Ksoc1) of the power conversion device 10*a*. In this case, the output power allocation to the power conversion device 10*b* corresponding to high SOC increases, so that, in some cases, the output power of the power conversion device 10*b* exceeds the rated value set in the rating maintaining calculation unit 56, depending on the magnitude of the load 40. Also in such a case, similarly, the rating maintaining calculation unit 56 of the control circuit 250 of the power conversion device 10*b* corrects the frequency-power characteristic gain using the rated control quantity (1+KR). Thus, the active power outputted from the power conversion device 10*b* is controlled to the rated value, and the power conversion device 10*a* performs follow-up control so as to autonomously additionally output power corresponding to the excess load power, whereby the output power allocation ratio is changed.

In the above description, for the rated control quantity for correcting the frequency-power characteristic gain, (1+KR) is used as shown in Expression (7), and the first gain Ksoc1 is multiplied by the rated control quantity (1+KR), to obtain the second gain Ksoc2. However, a method for correcting the first gain Ksoc1 is not limited thereto. The control circuit 250 of each power conversion device 10 (10*a*, 10*b*) may perform correction of subtracting the rated control quantity (KR) from the frequency-power characteristic gain (first gain Ksoc1) of the DC/AC inverter on the basis of the following Expression (8), thereby determining a new frequency-power characteristic gain (second gain Ksoc2).

$$Ksoc2=Ksoc1-KR \qquad \text{Expression (8)}$$

In the present embodiment, the value of the rated control quantity KR is a real number greater than 0, and is gradually increased from 0 as the excess amount by which the active power P exceeds the rated value increases. By setting the frequency-power characteristic gain (second gain Ksoc2) as described above, the frequency-power characteristic gain which is a negative value can be reduced, that is, the absolute value of the slope of the drooping characteristic of the frequency of the output voltage can be increased. As a matter of course, an upper limit value may be set for the rated control quantity KR.

In the power conversion device and the power system according to the present embodiment configured as described above, the same effects as in embodiment 1 are provided, so that variation in the frequency of the output voltage can be suppressed and stabilized, whereby the power conversion device is prevented from bearing an excessive power allocation, while stable operation can be performed.

In addition, when the output power of the DC/AC inverter exceeds the rated value, the control circuit calculates a control quantity for increasing the absolute value of the slope of the drooping characteristic of the frequency of the DC/AC inverter, corrects the first gain Ksoc1 by the control quantity, and uses the corrected first gain Ksoc1 as the second gain Ksoc2 for controlling the DC/AC inverter. Thus, the absolute value of the slope of the drooping characteristic of the frequency of the DC/AC inverter during a power period until the output power of the DC/AC inverter reaches the rated value, can be increased.

Thus, even in the case where the remaining capacity of the storage battery is great, without bearing excessive power allocation, the frequency of the output voltage is converged during the power period until the output power of the DC/AC inverter reaches the rated value, whereby the output power can be kept at or below the rated value. As a result, it is not necessary to set great power capacities for components in circuit designing of the power conversion device, and thus space saving and cost reduction can be achieved.

As in embodiment 1, the case where the power system 100 includes two power conversion devices 10 has been shown here, but the power system 100 may include three or more power conversion devices 10.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 storage battery (power storage device)
5 DC power supply unit
10, 10a, 10b power conversion device
20 DC/AC inverter (power converter)
40 load
50, 250 control circuit (control unit)
100 power system

The invention claimed is:

1. A power conversion device comprising:
a power converter which converts DC power from a DC power supply unit having a power storage device, to AC power, and outputs the AC power to a load; and
a control circuitry for controlling the power converter, wherein
the control circuitry controls the power converter so as to decrease a frequency of output voltage with increase in output power of the power converter, using a set reference gain,
in accordance with a detection value of state-of-charge information of the power storage device, the control circuitry corrects the reference gain by multiplying the reference gain by a correction value set in association with the state-of-charge information of the power storage device, and uses the corrected reference gain as a first gain for controlling the power converter, to adjust a slope of drooping characteristic of the frequency of the power converter, and
the correction value is a value that gradually decreases with increase in the state-of-charge information of the power storage device, a minimum value of the correction value is N1 which is a real number greater than 0 and corresponding to a first state of charge for stopping charging of the power storage device, and a maximum value of the correction value is N2 which is a real number greater than N1 and corresponding to a second state of charge for stopping discharging of the power storage device.

2. The power conversion device according to claim 1, wherein
the correction value is set so that a variation range of the frequency of the output voltage of the power converter is kept within a predetermined reference range.

3. The power conversion device according to claim 2, wherein
the correction value is set so as to have at least two sections in which the correction value gradually decreases at respective different slopes, between the first state of charge and the second state of charge.

4. The power conversion device according to claim 2, wherein
in the control circuitry, a rated value for the output power of the power converter is set, and
when the output power of the power converter exceeds the rated value, the control circuitry calculates a rated control quantity for increasing an absolute value of the slope of the drooping characteristic of the frequency of the power converter, corrects the first gain by the rated control quantity, and uses the corrected first gain as a second gain for controlling the power converter, to perform adjustment so as to increase the absolute value of the slope of the drooping characteristic of the frequency of the power converter during a power period until the output power of the power converter reaches the rated value.

5. The power conversion device according to claim 3, wherein
the slopes of the correction value in the respective sections between the first state of charge and the second state of charge are set such that an absolute value of the slope of the correction value in the section on a side of the first state of charge is smaller than an absolute value of the slope of the correction value in the section on a side of the second state of charge.

6. The power conversion device according to claim 3, wherein
in the control circuitry, a rated value for the output power of the power converter is set, and
when the output power of the power converter exceeds the rated value, the control circuitry calculates a rated control quantity for increasing an absolute value of the slope of the drooping characteristic of the frequency of the power converter, corrects the first gain by the rated control quantity, and uses the corrected first gain as a second gain for controlling the power converter, to perform adjustment so as to increase the absolute value of the slope of the drooping characteristic of the frequency of the power converter during a power period until the output power of the power converter reaches the rated value.

7. The power conversion device according to claim 5, wherein
in the control circuitry, a rated value for the output power of the power converter is set, and
when the output power of the power converter exceeds the rated value, the control circuitry calculates a rated control quantity for increasing an absolute value of the slope of the drooping characteristic of the frequency of the power converter, corrects the first gain by the rated control quantity, and uses the corrected first gain as a second gain for controlling the power converter, to perform adjustment so as to increase the absolute value of the slope of the drooping characteristic of the frequency of the power converter during a power period until the output power of the power converter reaches the rated value.

8. The power conversion device according to claim 1, wherein
the correction value is set so as to have at least two sections in which the correction value gradually decreases at respective different slopes, between the first state of charge and the second state of charge.

9. The power conversion device according to claim 8, wherein
the slopes of the correction value in the respective sections between the first state of charge and the second state of charge are set such that an absolute value of the slope of the correction value in the section on a side of the first state of charge is smaller than an absolute value of the slope of the correction value in the section on a side of the second state of charge.

10. The power conversion device according to claim 8, wherein
in the control circuitry, a rated value for the output power of the power converter is set, and
when the output power of the power converter exceeds the rated value, the control circuitry calculates a rated control quantity for increasing an absolute value of the slope of the drooping characteristic of the frequency of the power converter, corrects the first gain by the rated control quantity, and uses the corrected first gain as a second gain for controlling the power converter, to perform adjustment so as to increase the absolute value of the slope of the drooping characteristic of the frequency of the power converter during a power period until the output power of the power converter reaches the rated value.

11. The power conversion device according to claim 9, wherein
in the control circuitry, a rated value for the output power of the power converter is set, and
when the output power of the power converter exceeds the rated value, the control circuitry calculates a rated control quantity for increasing an absolute value of the slope of the drooping characteristic of the frequency of the power converter, corrects the first gain by the rated control quantity, and uses the corrected first gain as a second gain for controlling the power converter, to perform adjustment so as to increase the absolute value of the slope of the drooping characteristic of the frequency of the power converter during a power period until the output power of the power converter reaches the rated value.

12. The power conversion device according to claim 1, wherein
in the control circuitry, a rated value for the output power of the power converter is set, and
when the output power of the power converter exceeds the rated value, the control circuitry calculates a rated control quantity for increasing an absolute value of the slope of the drooping characteristic of the frequency of the power converter, corrects the first gain by the rated control quantity, and uses the corrected first gain as a second gain for controlling the power converter, to perform adjustment so as to increase the absolute value of the slope of the drooping characteristic of the frequency of the power converter during a power period until the output power of the power converter reaches the rated value.

13. The power conversion device according to claim 12, wherein
the control circuitry uses 1+KR as the rated control quantity, where KR is a real number greater than 0, and
the control circuitry gradually increases KR from 0 as an excess amount by which the output power exceeds the rated value increases, and performs correction by multiplying the first gain by 1+KR which is the rated control quantity.

14. The power conversion device according to claim 12, wherein
the control circuitry uses KR as the rated control quantity, where KR is a real number greater than 0, and
the control circuitry gradually increases KR from 0 as an excess amount by which the output power exceeds the rated value increases, and performs correction by subtracting KR which is the rated control quantity from the first gain.

15. The power conversion device according to claim 1, wherein
in the control circuitry, a value of the first state of charge and a value of the second state of charge are set, and
the control circuitry calculates and sets the correction value by using a function having such a correspondence relationship that the value thereof is set at N1 when the detection value of the state-of-charge information of the power storage device is the set first state of charge, the value is set at N2 when the detection value of the state-of-charge information of the power storage device is the set second state of charge, and the value is set so as to gradually decrease from N2 to N1 as the detection value of the state-of-charge information of the power storage device increases from the second state of charge to the first state of charge.

16. The power conversion device according to claim 15, wherein
the control circuitry divides a range between the set first state of charge and the set second state of charge, into a plurality of sections, and the function is set such that a slope of gradual decrease of the value thereof in each section differs among the respective sections.

17. The power conversion device according to claim 15, wherein
in the control circuitry, a discharge prohibited range for specifying a range of the state-of-charge information in which discharging of the power storage device is prohibited, is set,
the second state of charge is allowed to be set from outside, and
when a value of the second state of charge set from outside is within the discharge prohibited range, the control circuitry performs correction so that the set second state of charge becomes a value outside the discharge prohibited range.

18. The power conversion device according to claim 1, wherein
in the control circuitry, a value of the first state of charge and a value of the second state of charge are set, and
the control circuitry calculates and sets the correction value by using a data map having such a correspondence relationship that the value thereof is set at N1 when the detection value of the state-of-charge information of the power storage device is the set first state of charge, the value is set at N2 when the detection value of the state-of-charge information of the power storage device is the set second state of charge, and the value is set so as to gradually decrease from N2 to N1 as the detection value of the state-of-charge information of the power storage device increases from the second state of charge to the first state of charge.

19. A power system comprising a plurality of the power conversion devices according to claim 1, wherein
AC ends of the power conversion devices are connected in parallel and then connected to the load.

20. A power conversion device comprising:
a power converter which converts DC power from a DC power supply unit having a power storage device, to AC power, and outputs the AC power to a load; and
a control unit for controlling the power converter, wherein
the control unit controls the power converter so as to decrease a frequency of output voltage with increase in output power of the power converter, using a set reference gain,
in accordance with a detection value of state-of-charge information of the power storage device, the control unit corrects the reference gain by multiplying the reference gain by a correction value set in association with the state-of-charge information of the power storage device, and uses the corrected reference gain as a first gain for controlling the power converter, to adjust a slope of drooping characteristic of the frequency of the power converter, and
the correction value is a value that gradually decreases with increase in the state-of-charge information of the power storage device, a minimum value of the correction value is N1 which is a real number greater than 0 and corresponding to a first state of charge for stopping charging of the power storage device, and a maximum value of the correction value is N2 which is a real number greater than N1 and corresponding to a second state of charge for stopping discharging of the power storage device.

\* \* \* \* \*